LOW LEVEL AMPLIFIERS

Filed March 16, 1962

INVENTORS
JAMES A. EBY &
MYRON E. NORRIS
BY Hurvitz & Rose
ATTORNEYS

United States Patent Office 3,258,709

Patented June 28, 1966

3,258,709

LOW LEVEL AMPLIFIERS

James A. Eby, Pennington, and Myron E. Norris, Merchantville, N.J., assignors to Fifth Dimension Inc., Princeton, N.J., a corporation of New Jersey Filed Mar. 16, 1962, Ser. No. 180,110
15 Claims. (Cl. 330—69)

The present invention relates generally to low level amplifiers, and more particularly to low level amplifiers having provision for eliminating common mode responses.

In the amplification of low level signals, from 1–50 millivolts, the problem arises of rejecting unwanted or stray signals, often hundreds of times larger than the desired signal. It is known that improvements can be achieved by applying the signals, by means of two leads, to a differential amplifier. The desired signal is then applied differentially to the leads, but the unwanted signal occurs equally on the two leads. The differential amplifier then sees equal unwanted signals on the two leads and provides zero output in response thereto.

However, if the signal source has ground points, and unbalanced resistances and/or capacities to the ground points, it remains possible for common mode signals to appear as differential signals in the amplifier. Common mode signals so generated are accepted by the amplifier as if they were desired signals. The described defect can be cured if the amplifier can be disconnected from the common mode signal sources, i.e. if the amplifier is completely floating or disconnected from ground.

Connection to ground can occur via the system load circuit, or via the system power supply. According to the present invention, both the load circuit and the power source are disconnected from the amplifier, in respect to direct or resistive connections, and capacitive connections. All intercouplings are electromagnetic. For example, D.C. power to the amplifier is chopped into A.C. power, transformer coupled to the floating amplifier, and re-converted to D.C. internally of the amplifier. The output of the amplifier is chopped into A.C., transformer coupled to an output load, and there rectified into D.C. In the alternative, the output of the amplifier may be converted to time or frequency information and transformer coupled out of the amplifier in this form.

It is, accordingly, a broad object of the present invention to provide a differential amplifier having only magnetic coupling to a D.C. power supply and to a load circuit.

It is a further broad object of the present invention to provide a small signal amplifier which is completely isolated with respect to common mode signals.

As a further feature of the invention, the amplifier is connected throughout in the differential mode, and is connected to its source of power, i.e. to a transformer secondary winding in balanced relation with respect to a common or reference point which is itself floating.

As a further feature of the invention, D.C. power is supplied to an amplifier, deriving initially from a D.C. source, by converting the D.C. power to A.C. power in an oscillator, which may operate at sufficiently high frequency to simplify filtering and transforming problems and rectifying the high frequency A.C. power by means of rectifiers which are floating, or ungrounded.

It is another feature and object of the invention to provide a D.C. amplifier employing solid state elements throughout, including chopper circuitry.

The above and still further objects, features and advantages of the present invention will become apparent upon consideration of the following detailed description of one specific embodiment thereof, especially when taken in conjunction with the accompanying drawings, wherein.

Figure 1:
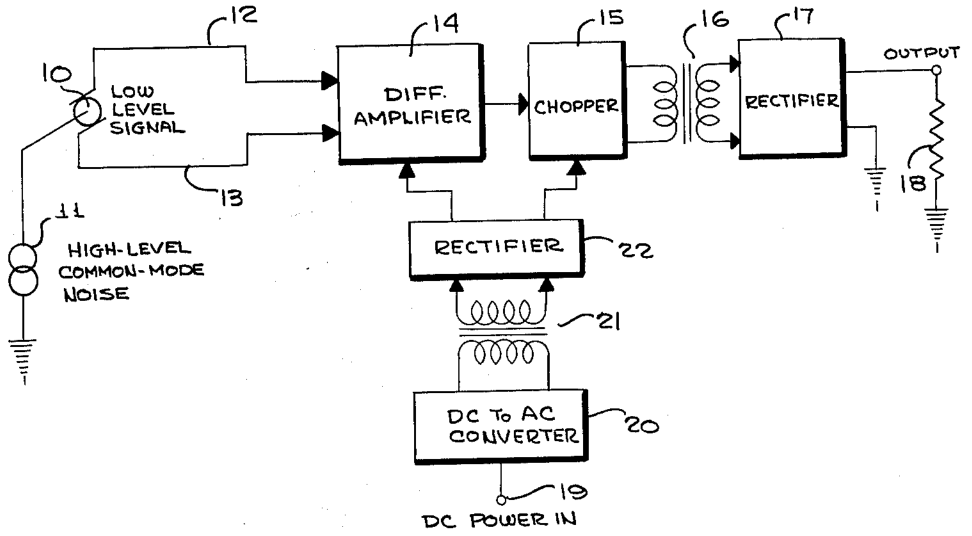
FIGURE 1 is a block diagram of a system according to the invention.

Referring now to FIGURE 1 of the accompanying drawings, the reference numeral 10 denotes in generalized fashion a source of low level signal and the reference numeral 11 a source of high-level common mode noise or undesired signal. The desired signal may derive from a thermocouple, to provide a specific example of a signal source.

The low level signal provided by source 10 appears across two input leads 12, 13 of a differential amplifier 14, which provides an output proportional to input signal amplitude. The noise signal, on the other hand is applied in parallel, or identically, to the leads 12, 13, so that no differential output appears.

The output of amplifier 14 is a D.C. signal, which is applied to a chopper 15 for conversion to A.C. signal. The output of chopper 15 is transformer coupled, via transformer 16, to a rectifier 17, which in turn supplies to a load 18, a D.C. signal, which is proportional to the D.C. signal provided by source 10. The output D.C. load can be a grounded load, but nevertheless involves no circuit to ground from any point in the amplifier.

The utilization of a differential amplifier to reduce common mode noise, and the inductive isolation of the load circuit, does not itself suffice to remove common mode noise to the extent required for many applications. Essentially, this is because amplifiers require power supplies, and these provide circuits to ground within the amplifier. If then, unbalance exists in the amplifier on in the signal path, the common mode signals are present differentially, output signal will appear in response. The latter can be avoided by completely disconnecting the amplifier from ground, and thus breaking all circuits through which common mode currents can flow in the amplifier. All common mode signal sources may be assumed to exist with respect to ground, so that elimination of ground connections to the amplifier at one stroke eliminates all possible entry points for common mode signals.

It may be assumed that D.C. power exists for application to the amplifier, bearing in mind that the D.C. power may derive from an A.C. supply by rectification. The D.C. power, available on terminal 19, is applied to a D.C. to A.C. converter, 20, generally an oscillator. The latter is coupled via transformer 21, to one or more rectifiers 22, which in turn supply D.C. power to differential amplifier 14, and chopper actuating or switching current to chopper 15. The frequency of output of D.C. to A.C. converter 20 may be selected sufficiently high to minimize problems of filtering and transformer design, in the system.

Figure 2:
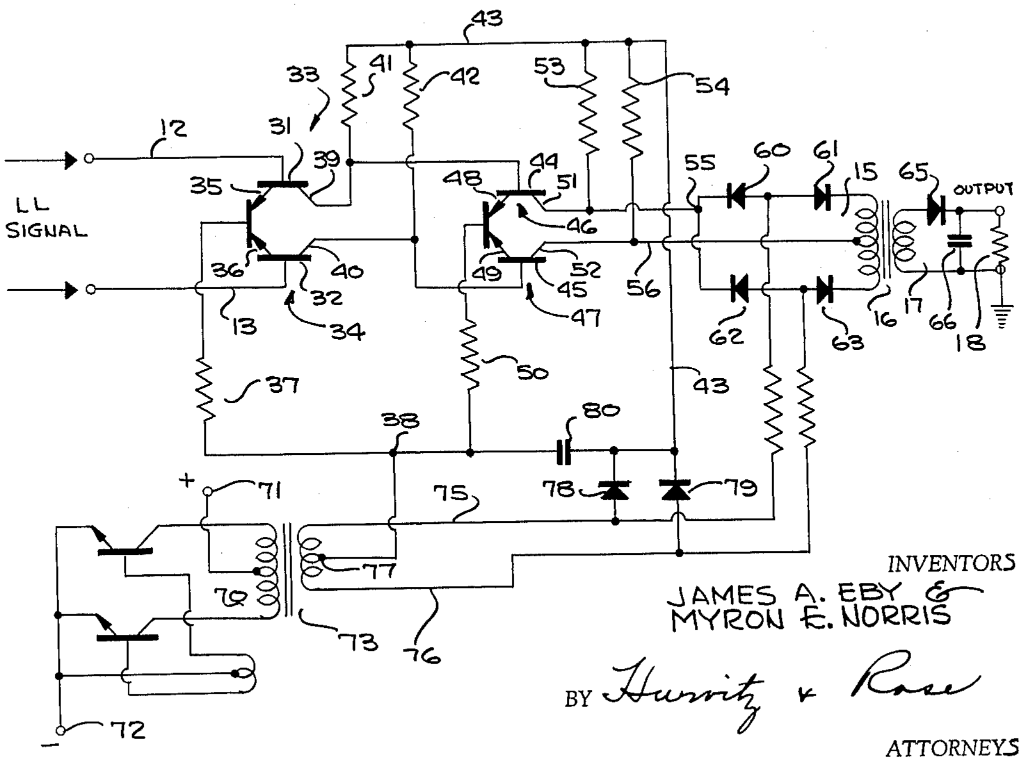
FIGURE 2 is a schematic circuit diagram of the amplifier of FIGURE 1.

In FIGURE 2 of the drawings, the leads 12, 13 are connected to bases 31, 32 of transistors 33, 34. The emitters 35, 36 of transistors 33, 34 are connected together, and via a common bias resistance 37, to a point of reference potential 38, which is isolated from ground. The collectors 39, 40 of transistors 33, 34 are loaded by resistances 41, 42, which are commonly connected to bus 43.

The collectors 39, 40 are directly connected to bases 44, 45 of transistors 46, 47. Emitters 48, 49 are connected directly together, and via a bias resistance 50 to reference point 38. The collectors 51, 52 are loaded by resistances 53, 54, which are in turn connected to bus 43. Amplifier output, still in D.C. form, then appears at leads 55, 56.

The two stage amplifier of FIGURE 2 is differential, with respect to signals impressed between leads 12, 13, and is a D.C. amplifier, by virtue of the direct couplings employed throughout.

Lead 55 is connected to diodes 60, 61, in series with each other, and connected back to back, and also diodes 62, 63, in series with each other and back to back. The cathodes of diodes 60 and 62 are connected directly to collector 51, and the cathodes of diodes 61, 63 to the ends of the primary winding of transformer 16. Collector 52 is directly connected to the mid-point of the primary winding of transformer 16, by lead 56.

The secondary winding of transformer 16 is a single ended transformer, which drives a single diode 65, and a filter condenser 66, constituting rectifier 17, and load circuit 18 appears across filter condenser 66.

A conventional push-pull self oscillator 70 converts D.C. power available between terminals 71, 72 into relatively high frequency A.C. power, say at 10 kc. The output of oscillator 70 is coupled via transformer 73 to A.C. power leads 75, 76, the secondary winding of transformer 73 having a mid-point tap 77, which is connected to reference point 38.

The leads 75, 76 are connected through full-wave rectifiers 78, 79, to bus 43, filter capacitor 80 providing the usual filter action at the frequency of oscillator 70. Leads 75, 76 are connected via resistor 37 to the junction of rectifiers 60, 61 and 62, 63, respectively, and there provide oppositely phased chopping or switching potentials.

Chopper current from leads 75, 76 is modulated in amplitude by difference of signal voltage on leads 55, 56, whereby primary current in the primary winding of transformer 16 is a direct function of differential signal level at leads 12, 13. The modulated current, at the frequency of oscillator 70, is rectified by rectifier 17 and provides amplified D.C. current in load 18.

While I have described and illustrated one specific embodiment of my invention, it will be clear that variations of the details of construction which are specifically illustrate and described may be resorted to without departing from the true spirit and scope of the invention as defined in the appended claims.

What is claimed is:

1. A low level signal translator, comprising a differential amplifier having an output circuit, a wholly electromagnetic coupling network including a coupling transformer for coupling said output circuit to a load, a D.C. to A.C. to D.C. power supply connected to said amplifier, said D.C. to A.C. to D.C. power supply including an oscillator, an ungrounded or floating rectifier, and solely a transformer coupling the power output of said oscillator to said rectifier, said rectifier being connected as a power source and being the sole power source for said differential amplifier.

2. A low level bi-lateral signal translator for coupling a signal to a load, comprising a cascaded D.C. to A.C. to D.C. converter including at least one solely electromagnetic cascaded coupling element, said translator including a solely electromagnetic coupling to said load and a power supply lead for said translator connected to the D.C. output of said converter.

3. An amplifier for low level direct current signals, comprising a differential direct current amplifier, said amplifier including at least one differential stage of amplificaiton, said amplifier including only floating elements and further including an output circuit, a floating chopper connected in cascade with said output circuit, a signal output transformer connected in cascade with said chopper, said transformer including a floating primary winding, and a secondary winding, an output rectifier connected to said secondary winding, a direct current to alternating current power converter, a further transformer coupled in cascade with the alternating current side of said converter, said transformer including a floating secondary circuit, a floating rectifier connected to said secondary circuit, and a means connecting said floating rectifier to supply direct current power to said floating amplifier.

4. The combination according to claim 3 wherein said chopper is a solid state chopper provided with chopper current from the alternating current side of said converter.

5. A low level active D.C. signal translator for coupling a D.C. signal to a load, a differential amplifier responsive to said D.C. signal, a floating power supply for said differential amplifier including only ungrounded circuitry, means magnetically coupling said power supply to said differential amplifier and arranged to supply D.C. power to said differential amplifier, and means for deriving output signal from said differential amplifier, said last means including only electro-magnetic coupling between said amplifier and said load.

6. The combination according to claim 5 wherein said differential amplifier includes means for converting said D.C. signal to modulated signal conveying information of D.C. level in terms of modulation.

7. The combination according to claim 6 wherein the modulation is amplitude modulation.

8. In a differential amplifier system, a differential amplifier having an input circuit, a source of direct current power for said amplifier, means for converting said direct current power to alternating current power, solely electromagnetic coupling means consisting of a transformer having a primary winding energized by said alternating current power and having a secondary winding, a power rectifier connected to said secondary winding for rectifying the current provided by said secondary winding, and means isolating said secondary winding and said power rectifier from ground via any capacitive or resistive path, and a source of direct current signal connected in differential relation to said input circuit.

9. The combination according to claim 8 wherein said means for converting is an oscillator.

10. In combination, a direct current differential amplifier having a pair of input terminals, a source of low level direct current signal connected between said input terminals, said differential amplifier having a pair of output terminals, a modulator connected in cascade with output terminals, said modulator being arranged to convert direct current input signal provided by said output terminals to alternating current signals, a purely electromagnetic coupling device connected in cascade with said modulator, said coupling device including a primary winding and a secondary winding, means isolating said primary winding from ground, a rectifier in series with said secondary winding, and a load circuit connected to derive direct current signal from said rectifier.

11. The combination according to claim 10 wherein one side of said load circuit is grounded.

12. The combination according to claim 10 wherein is provided a direct current source of power for said amplifier, an oscillator powered by said direct current source, a power transformer coupled to said oscillator, said transformer including a secondary winding, means isolating said secondary winding from ground, means for rectifying and filtering current delivered by said secondary winding, means isolating said last named means from ground, and a D.C. lead connecting said means for rectifying to said amplifier in power supply relation thereto.

13. A differential amplifier, including a pair of transistors interconnected in direct current differential amplifier configuration and having two signal input leads and two signal output leads, a modulator, means connecting said two output leads to said modulator in signal supply relation, said modulator being arranged to provide alternating current signal output modulated by the signal on said two output leads, a load circuit, and purely electromagnetic coupling means coupling said load circuit to said modulator, said purely electromagnetic coupling means comprising a primary winding isolated from ground and a grounded secondary winding.

14. In a chopper amplifier system, a differential amplifier, a chopper oscillator, means rectifying and filtering the oscillations provided by said chopper oscillator to provide filtered direct current voltage for powering said amplifier, a solid state chopper modulator for chopping signal output provided by said amplifier, and means driving said chopper modulator in response to said oscillations.

15. In an amplification system, a floating source of low level direct current signal having two floating input terminals, and an output circuit, a floating differential amplifier having an input circuit coupled to said terminals and a grounded load circuit coupled to said output circuit, wherein is provided a source of direct current power for energizing said amplifier, said source of direct current power being a totally floating source of direct current power, and solely transformer coupling means located between said grounded load circuit and said output circuit, said solely transformer coupling means including a secondary winding connected to said load circuit, and a floating primary winding connected to said output circuit.

References Cited by the Examiner

UNITED STATES PATENTS

| | | | |
|---|---|---|---|
| 2,436,741 | 2/1948 | Bussey | 330—69 X |
| 2,931,985 | 4/1960 | Offner | 330—69 X |
| 3,088,076 | 4/1963 | Burwen | 330—9 |
| 3,089,097 | 5/1963 | Bell | 330—10 X |
| 3,156,859 | 11/1964 | Cox | 330—10 X |

ROY LAKE, *Primary Examiner.*

N. KAUFMAN, *Assistant Examiner.*